THOMAS S. CLOGSTON

Heating Apparatus.

2832

Reissued.

Jan 14 1868

Thos. S. Clogston
by his attorney
A Bolton

Witnesses
A. C. Flint
H. Gardner

United States Patent Office.

THOMAS S. CLOGSTON, OF BOSTON, MASSACHUSETTS.

*Letters Patent No.* 45,389, *dated December* 13, 1864; *reissue No.* 2,832, *dated January* 14, 1868.

IMPROVEMENT IN HEATING-APPARATUS.

The Schedule referred to in these Letters Patent and making part of the same.

TO ALL TO WHOM THESE PRESENTS SHALL COME:

Be it known that I, THOMAS S. CLOGSTON, of Boston, in the county of Suffolk, and State of Massachusetts, have invented certain new and useful Improvements in Heating or Heat-Radiating Apparatus; and do hereby declare the following to be a full, clear, and exact description of the same, due reference being had to the accompanying drawing, making part of this specification, and in which—

Figure 1:
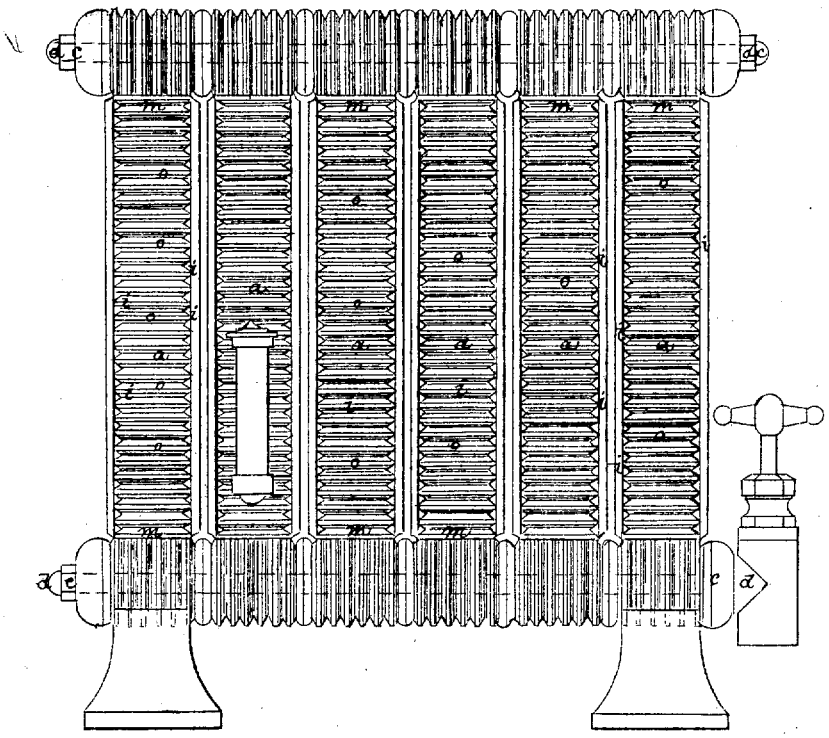
Figure 2:
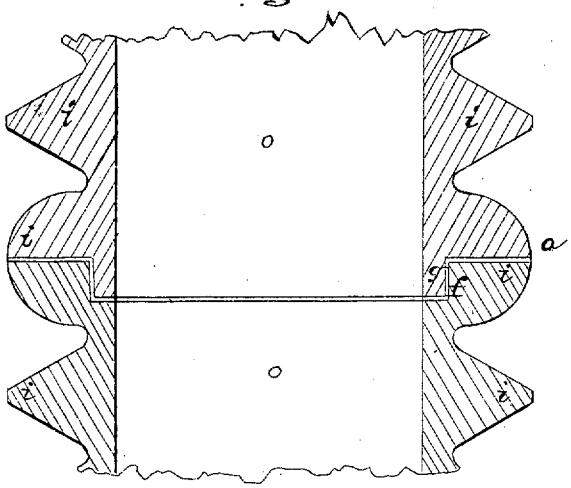

Figure 1 is an elevation,

Figure 2 a section of one of the joints uniting its pipes or tubes.

The present invention relates to certain improvements in the construction of the apparatus used for the purpose of heating apartments or buildings by means of steam or hot water.

The object of the invention is to provide a simple and efficient apparatus for heating-purposes, one combining great strength of parts with large heat-radiating surface.

In my new apparatus, which is a tubular one, the outer surface of each tube or passage, through which either steam or hot water is to pass, is composed of a series of annular projections, of any desired shape, such as circular, spiral, elliptical, &c., forming encompassing-rings or bands, which answer the purpose of greatly strengthening the tubes, and increasing their radiating-surface. These tubes may be made in one entire piece, but I prefer, for the purpose both of strength and ease of construction, to cast them in short sections, formed with lips and grooves upon their ends, fitting into each other in such manner that when drawn together and secured by suitable bolts, they can neither become separated by contraction or expansion, nor become leaky.

In the accompanying drawings, which represent a steam-heating or radiating apparatus, *a a a* denote a series of vertical tubes, having hollow T's, *m m*, &c., formed upon their extremities, which, when fastened together by bolts *c c*, &c., running through them, and provided with nuts *d d* at their extremities, constitute the upper and lower horizontal tubes of the apparatus.

If the horizontal pipes did not thus constitute a part of the vertical tubes, but were formed independently thereof, and these fastened thereto, the unequal expansion and contraction of the different parts of the radiator, in consequence of one tube heating faster than another, would have a tendency to separate the joints between the vertical and horizontal tubes, whereas, by the construction above described, such a result cannot possibly occur.

The different hollow sections *o o o*, composing the vertical tubes, have formed in each alternate end a groove, *f*, and lip *g*, of such a conforming shape and size as to fit into each other, and thus, when a series of sections is jointed to form a whole, they support each other, and so as to prevent sagging and leaking. The tubes *a a a*, as a whole, or the sections composing them, have around each of their peripheries a series of rings or annular projections, *i i i*, &c., such rings giving great strength to the tubes, which, being composed of cast metal, would otherwise be liable to fracture. The rings also greatly increase the amount of heat-radiating surface of the different tubes, as will be apparent without further explanation.

I claim the application and use, for heating-purposes, of one or more tubes having a corrugated or annular-ribbed surface, in combination with a boiler, or other suitable steam-generator, and pipes for conducting the steam or hot water from said generator to the corrugated tubes, essentially as herein shown and described.

T. S. CLOGSTON.

Witnesses:

CHARLES H. COOK,

FREDERICK CURTIS.